US007615279B2

(12) United States Patent
Allen

(10) Patent No.: US 7,615,279 B2
(45) Date of Patent: Nov. 10, 2009

(54) ART SURFACE AND METHOD FOR PREPARING SAME

(75) Inventor: Kenneth Allen, Canton, TX (US)

(73) Assignee: RTISTX, LLC, Canton, TX (US)

( * ) Notice: Subject to any disclaimer, the term of this patent is extended or adjusted under 35 U.S.C. 154(b) by 0 days.

(21) Appl. No.: 11/006,108

(22) Filed: Dec. 7, 2004

(65) Prior Publication Data

US 2006/0121320 A1 Jun. 8, 2006

(51) Int. Cl.
*B32B 27/06* (2006.01)

(52) U.S. Cl. ............... 428/319.3; 428/319.7; 428/913.3

(58) Field of Classification Search ................. 524/430; 428/913.3, 319.3, 319.7

See application file for complete search history.

(56) References Cited

U.S. PATENT DOCUMENTS 1,873,945 A 8/1932 Kraenzlein et al.
4,065,596 A * 12/1977 Groody ...................... 428/215
4,138,523 A * 2/1979 Katsurayama et al. ...... 428/216
4,153,461 A * 5/1979 Berghauser et al. ......... 430/160
4,207,366 A 6/1980 Tyler
4,911,954 A * 3/1990 Tatsuno et al. .............. 427/409
4,978,568 A * 12/1990 Postma ....................... 428/192
5,340,386 A 8/1994 Vincent et al.
5,360,664 A 11/1994 Hamm
5,863,638 A 1/1999 Harvey
6,127,019 A 10/2000 Means
6,168,127 B1 * 1/2001 Saylor et al. ............. 248/442.2
6,258,412 B1 7/2001 Ewing
6,423,379 B1 7/2002 Ewing
6,465,046 B1 * 10/2002 Hansson et al. ............. 427/256
6,555,216 B2 * 4/2003 Chen et al. ............... 428/322.7
6,838,505 B2 * 1/2005 Purbrick et al. ............. 524/430
2001/0006324 A1 * 7/2001 Araki et al. ................. 313/479
2001/0036598 A1 * 11/2001 Shimada et al. .......... 430/281.1
2002/0009622 A1 1/2002 Goodson
2003/0051623 A1 3/2003 Ellis, II
2004/0202960 A1 10/2004 Ellis, II
2005/0019557 A1 * 1/2005 Kajihara et al. ............. 428/329
2005/0241197 A1 * 11/2005 Ternovits et al. .............. 40/600
2006/0247353 A1 * 11/2006 Ueda et al. .................. 524/430

FOREIGN PATENT DOCUMENTS

GB 1551486 A * 8/1979

OTHER PUBLICATIONS

English Translation of JP 2002-187921, Ueda et al, "Curable Composition and Its Cured Product", Jul. 5, 2002.*
Translation of JP 61-281133, Nakamoto et al, "Composition for Coating Surface", Dec. 11, 1986.*
Mesh to Micron Conversion Chart, copyright (C) 2002, Property of TM Industrial Supply, Inc., 1 page.*

* cited by examiner

*Primary Examiner*—Hai Vo
(74) *Attorney, Agent, or Firm*—Scott T. Griggs; Griggs Bergen LLP

(57) ABSTRACT

An art surface and a method for preparing the same are disclosed. In one embodiment, a coating is disposed on a thermoplastic compatible surface of a substrate. The coating includes a reaction product of a thermoplastic, aluminum oxide, and acetone. Further, the coating is able to accept one or more artistic media such as acrylic, chalk, charcoal, colored pencil, conte, dyes, egg tempera, oil, pastel, or water color, for example.

8 Claims, 1 Drawing Sheet

ART SURFACE AND METHOD FOR PREPARING SAME

TECHNICAL FIELD OF THE INVENTION

This invention relates, in general, to artist's boards and, in particular, to an art surface that is able to accept and retain a wide variety of artistic mediums including mixed media.

BACKGROUND OF THE INVENTION

Traditionally, art surfaces have included art boards having substrates such as canvas, wood panels, and paper while artist's media have included pencil, charcoal, pastels, inks, and paints, for example. The choice of board depends on the choice of medium since each of the artist's boards interacts differently with the various media and, typically, an artist's board is suitable with only a limited number of media. An ideal artist's board must accept the chosen medium while permitting the artist to modify and/or remove the medium from the surface of the board during development of the work. Further, the ideal artist's board retains the artist's final work while avoiding cracking, warping, and loss of integrity over time. Consequently, the selection of board and medium is critical and a need has arisen for an artist's board which accepts and retains a greater number of media.

SUMMARY OF THE INVENTION

An art surface and a method for preparing the same are provided. In one embodiment, a coating is disposed on a thermoplastic compatible surface of a substrate. The coating includes a reaction product of a thermoplastic, aluminum oxide, and acetone. The coating accepts one or more artistic media such as acrylic, chalk, charcoal, colored pencil, conte, dyes, egg tempera, oil, pastel, or water color. The artist's finished product avoids cracking, warping, and loss of integrity over time.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
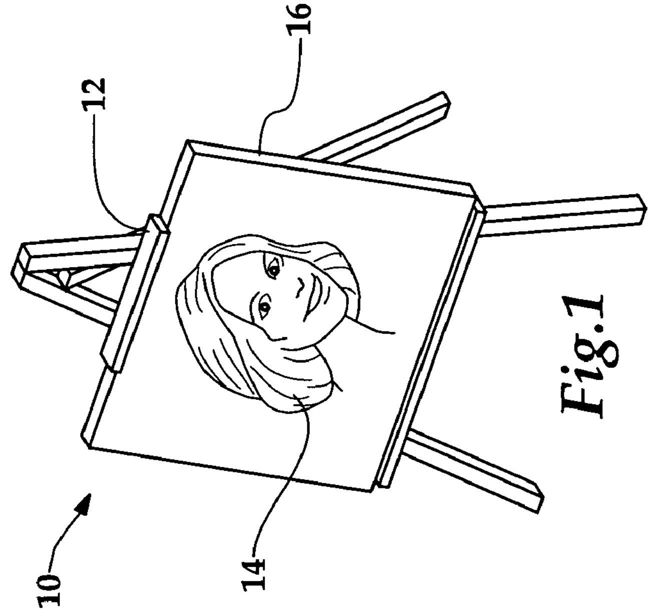
FIG. 1 is a perspective view of one embodiment of an art surface that has been utilized to create a mixed media art work.

Referring initially to FIG. 1, a mixed media art work 10 is presented. An easel 12, which is depicted as a collapsible tripod easel, supports the art work 10 while the artist paints a portrait 14 onto an art surface 16 that has been treated with a coating prepared in accordance with the teachings presented herein.

The medium or media selected by the artist may be applied by brush, spray gun, roller, or dipping, for instance. By way of example and not by way of limitation, a few of the more common media that may be utilized with the art surface will be briefly discussed to illustrate the diversity of media accepted by the art surface 16. Acrylic is a water-based "plastic" paint that is thicker and stronger than tempera or watercolor paint. Conte is a modern pencil lead that includes black, red, or brown chalk. Egg tempera is a water-based paint made with an egg yoke binder. Oil is the dominate painting media that offers great versatility, ease of manipulation, and lack of color change when the work dries. Pastels are colors available in stick form that range from soft to brilliant. Water color is a translucent, water-based paint that is available in cake or tube form. Other media including chalk, charcoal, colored pencil, and dyes may also be utilized with the art surface. As previously mentioned, the art surface permits any of the aforementioned media to be utilized alone or in a mixed media art work.

The art surface 16 includes a substrate having a thermoplastic compatible surface and a coating disposed on the thermoplastic compatible surface. The coating includes a reaction product of a thermoplastic and aluminum oxide ($Al_2O_3$). The coating enables the art surface 16 to accept a wide variety of media. Further, the effects of the art surface 16 are very favorable. For example, layers are easy to build on the art surface 16 and colors remain very true after drying on the art surface 16.

Figure 2:
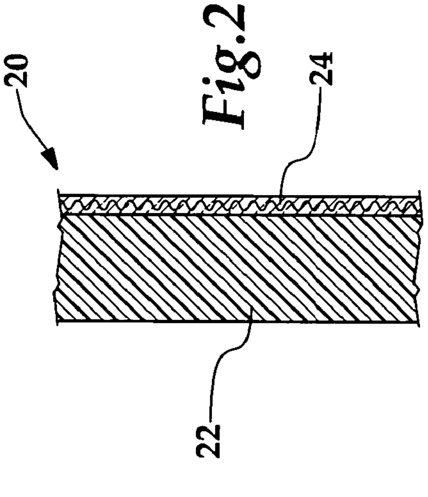
FIG. 2 is a side cross sectional view of one embodiment of an art surface.

FIG. 2 depicts one embodiment of an art surface 20 which comprises a substrate 22 having a coating 24 disposed thereon. In one implementation, the substrate 22 includes a thermoplastic compatible surface material that may comprise polycarbonate substrates, acrylic substrates, impact modified acrylic substrates, vinyl substrates, polyvinyl chloride (PVC) substrates, or acrylonitrile butadiene styrene (ABS) substrates, for example. PVC substrates and ABS substrates, which are rigid, foamed, closed-cell structures, have been found to be particularly suitable materials for the substrate. Although the substrate 22 is depicted as uniformly comprising a thermoplastic compatible material, it should be appreciated that the outer surface of the substrate 22 may comprise the thermoplastic compatible material while the interior of the substrate 22 may comprise material which is not compatible with thermoplastics.

The coating may be formulated by the reaction product of a thermoplastic, aluminum oxide, and acetone. In one embodiment these components are mixed together in the following ratios:

thermoplastic 1 pound (453 grams) to 3.5 pounds (1,588 grams) of aluminum oxide per 1 gallon of thermoplastic 1 ounce (29.6 milliliters)—30 ounces (887 milliliters) of acetone per 1 gallon of thermoplastic The thermoplastic is a high polymer that softens when exposed to heat and returns to its original condition when cooled to room temperature. The thermoplastic solidifies or cures when heated such that the thermoplastic is cross-linked with the molecular constitutes of the aluminum oxide and the substrate. Acceptable thermoplastics include synthetics such as polyvinyl chlorides, nylons, fluorocarbons, linear polyethylenes, polyurethanes (including polyurethane prepolymer systems), polystyrene, polypropylenes, cellulosics, acrylic resins, acrylics, and combinations thereof. Acrylics and polyurethanes have been found to be particularly suitable. In one implementation, the acrylic may include polymers or copolymers of acrylic acid, methacrylic acid, esters of these acids, or acrylonitrile, for example. Similarly, the polyurethane may be the produced by the condensation reaction of a polisocyanate and a hydroxyl-containing material, e.g., a polyol derived from propylene oxide or trichlorobutylene oxide.

The aluminum oxide may be in the form of a white powder or lumps of various meshes. Particularly suitable mesh sizes are between approximately 180 and approximately 320. The acetone facilitates the reaction between the thermoplastic and the aluminum oxide. Suitable alternatives to acetone include methyl isobutyl ketone, methyl isobutyl carbinol, methyl methacrylate, and bisphenol-A, for example. Additionally, non-primary components may be added to the coating. By way of example, fillers, anti-aging agents, and coloring agents may be added. In one embodiment, a reducer is added to the thermoplastic, aluminum oxide, and acetone reaction. In one implementation, the reducer may comprise a mixture of ethanol, butanol, and toluene that improves the reaction between the thermoplastic and aluminum oxide.

In another implementation, the substrate may be a polycarbonate substrate, acrylic substrate, impact modified acrylic substrate, vinyl substrate, PVC substrate, or ABS substrate that is not intended to be an artist's board. By way of example, the substrate may be aluminum track molding, skylight interiors, architectural panels, skateboard surfaces, boat decks, gutters, vinyl paneling, vinyl sliding, or vinyl roofing. More particularly, the coating provides a UV and radiant heat barrier as well as providing a non-slip, paintable surface. The UV and radiant heat barrier properties are particularly applicable to skylights. Accordingly, in one implementation, the coating, which may be prepared to be transparent, may be sprayed onto the interior of a skylight to act as a UV and radiant heat barrier. The non-slip, paintable surface properties of the coating are particularly applicable to architectural panels, skateboard surfaces, boat decks, gutters, vinyl paneling, vinyl sliding, and vinyl roofing. For example, the coating may be sprayed onto a skateboard or boat deck to provide a surface which provides a non-slip, paintable surface.

Figure 3:
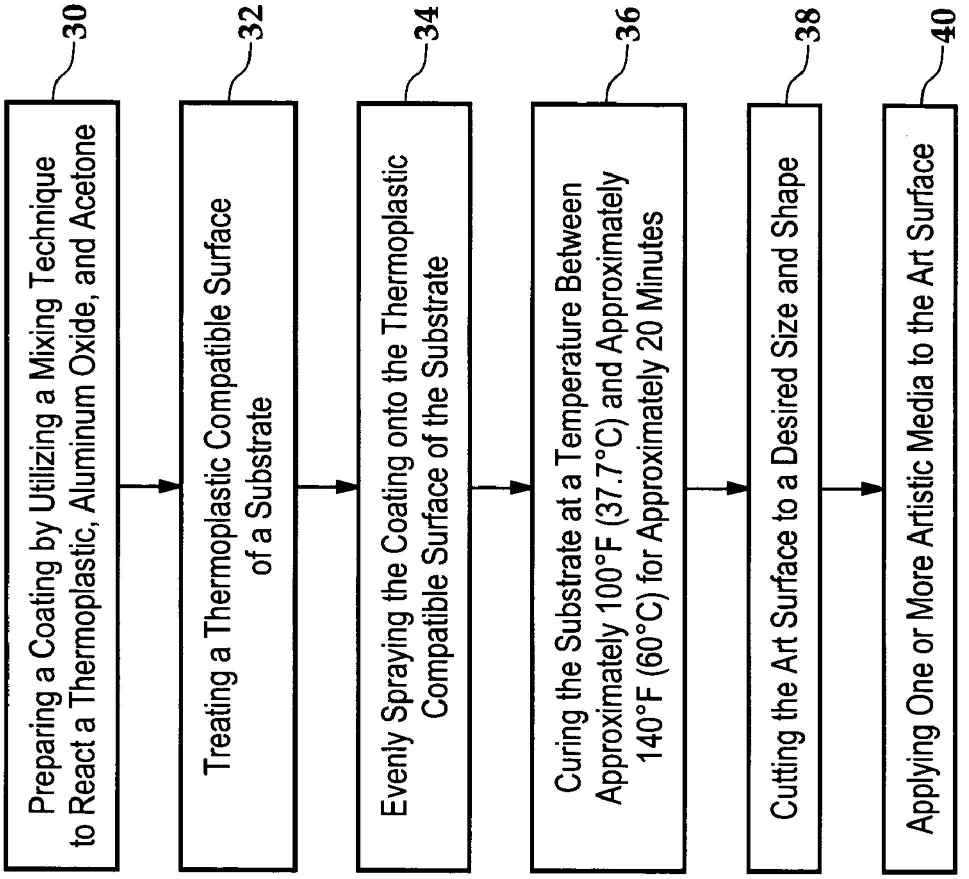
FIG. 3 is a flow chart of one embodiment of a method for preparing an art surface.

FIG. 3 depicts one embodiment of a method for preparing an art surface. At block 30, a coating is prepared by mixing a thermoplastic, aluminum oxide, and acetone. In one implementation, as previously discussed, the coating may include non-primary components such as fillers, anti-aging agents, and coloring agents. At block 32, a thermoplastic compatible surface of a substrate is treated with a cleaning agent to remove any existing surface contaminates or static electricity, for example.

At block 34, the coating is evenly sprayed onto the thermoplastic compatible surface of the substrate. At block 36, the substrate is cured at a temperature between approximately 100° F. (37.6° C.) and approximately 140° F. (60° C.) for approximately 20 minutes. It should be appreciated, however, that the curing time varies with curing temperature and the ambient humidity. Accordingly, the curing time may be more or less than 20 minutes. For example, in some instances, the curing time may vary from approximately 18 minutes to approximately 28 minutes. Additional coats may be added as necessary by repeating the operations described in association with blocks 34 and 36.

The art surface may be available in common canvas sizes such as 12"×16", 18"×24", 36"×48", and 48"×72", for example. If the size or shape of the art surface is not acceptable to the artist, at block 38, the art surface is cut to a desired size and shape by scoring the surface with an artist's razor knife. In particular, the art surface may by scored to any particular size and shape including shapes that are elliptical, irregular, or abstract.

The ability to easily customize the size and shape of the canvas is an improvement over existing canvases which are available in standard sized panels or obtainable by-the-yard for customization. Previously, artists who made canvases of a custom size and shape with canvas by-the-yard had to also order or manufacture a custom frame. The art surfaces prepared in accordance with the teachings presented herein eliminate the time and expense involved with preparing custom canvases and custom frames. Moreover, the art surfaces permit the artist to design and use canvases of non-traditional, non-rectangular sizes. At block 40, one or more artistic media are applied to the art surface.

The present invention will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

Acetone is a colorless, volatile liquid, having a chemical formula $CH_3COCH_3$, that is readily available.

CELTEC® PVC board is an expanded rigid foamed polyvinyl chloride (PVC) sheet available in thicknesses of 1 millimeter to 25 millimeters and different colors including black and white from Compression Polymers Corp. and Vycom Corp. (both of Moosic, Pa.).

GRIP-FLEX® SOLAR CLEAR™ 200 coating is a transparent acrylic thermoplastic from Akzo Nobel Coatings, Inc. (Norcross, Ga.).

GRIP-FLEX® SOLAR CLEAR™ 266 coating is an acrylic thermoplastic from Akzo Nobel Coatings, Inc. (Norcross, Ga.).

KÖMATEX® PVC board is a foamed PVC sheet available in A variety of thicknesses, colors, and sizes from Kömmerling USA, Inc. (Huntsville, Ala.).

MICROGRIT A® grains are blocky, water classified and closely graded, natural color aluminum oxide grains available in meshes of size 8 to size 1200 (FEPA standard) from Micro Abrasives Corporation (Westfield, Mass.).

MICROGRIT WA® grains are high purity, friable, white aluminum oxide grains available in meshes of size 8 to size 600 (FEPA standard) from Micro Abrasives Corporation (Westfield, Mass.).

MIXIT® color system from Akzo Nobel Coatings, Inc. (Norcross, Ga.) provides tens of thousands of colors to the GRIP-FLEX® coatings such as the GRIP-FLEX®SOLAR CLEAR™ 200 and 266 coatings mentioned hereinabove.

SINTRA® PVC board is a foamed PVC sheet available in A variety of thicknesses, colors, and sizes from Alcan Composites USA Inc. (St. Louis, Mo.).

T-2003™ reducer is a medium temperature reducer comprising ethyl alcohol, butanol, toluene, ethylene glycol monobutyl ether, and other primary components from Akzo Nobel Coatings, Inc. (Norcross, Ga.).

T-2004™ reducer is a fast reducer comprising ethanol, butanol, toluene, and other primary components from Akzo Nobel Coatings, Inc. (Norcross, Ga.).

Example I. A coating is prepared by adding the following components to a pressure pot having a mixing element that operates under the power of an electric motor:

2.2 pounds (997 grams) MICROGRIT WA® No. 240 mesh grains 1 gallon (3.75 liters) GRIP-FLEX® SOLAR CLEAR™ 266 coating 8 ounces (236 milliliters) T-2003™ reducer 20 ounces (591 milliliters) acetone The 1 gallon (3.75 liters) of GRIP-FLEX® SOLAR CLEAR™ 266 coating weighs approximately 2.2 pounds (997 grams). Accordingly, in one implementation the weight ratio of aluminum oxide to thermoplastic is approximately 1:1; however, as further examples presented hereinbelow demonstrate the weight ratio of aluminum oxide to thermoplastic may vary from approximately 0.45:1 to approximately 1.6:1.

While the coating is being mixed, a 3 millimeter white CELTEC® PVC board is mounted with a bar and pin arrangement onto a mobile rack. The surface of the CELTEC® PVC board is cleaned using a T-2004™ reducer to remove any existing surface contaminates or static electricity, for example. Once the coating is completely mixed and homogeneous, a pressured siphon feed is utilized to uniformly spray the coating onto the CELTEC® PVC board. In one implementation, the coating is sprayed on from left-to-right and then another coat is sprayed on from right-to-left.

The rack onto which the coated CELTEC® PVC board is mounted is moved into a controlled temperature environment or dry room. The coated CELTEC® PVC board is subjected to a temperature of 120° F. (48.8° C.) for approximately 20 to 24 minutes in order to cure the coating. Once the coating is cured, the coated CELTEC® PVC board is removed from the controlled temperature environment. The coating is inspected and, if necessary, the pressured siphon may be again utilized to uniformly spray another coat or coats of the coating onto the CELTEC® PVC board. Following the application of the additional coats, the coated CELTEC® PVC board is returned to the controlled temperature environment and again subjected to a temperature of 120° F. (48.8° C.) for approximately 20 to 24 minutes in order to cure the second coating. Finally, the coated CELTEC® PVC board, i.e., the art surface, may be cut to the desired size and shape by scoring the art surface with an artist's razor knife.

Example II. The art surface was prepared substantially according to the procedures presented in Example I with the components noted in Table I.

TABLE I

| Art Surface Preparation | |
|---|---|
| Substrate | Coating |
| 6 mm KÖMATEX ® PVC board | 1 pound (453 grams) MICROGRIT A ® No. 240 mesh grains<br>1 gallon (3.75 liters) GRIP-FLEX ® SOLAR CLEAR ™ 266 coating<br>2 ounces (59.1 milliliters) T-2003 ™ reducer<br>4 ounces (118 milliliters) acetone |

Example III. The art surface was prepared substantially according to the procedures presented in Example I with the components noted in Table II.

TABLE II

| Art Surface Preparation | |
|---|---|
| Substrate | Coating |
| 3 mm, colored SINTRA ® PVC board | 2 pounds (907 grams) MICROGRIT WA ® No. 240 mesh grains<br>1 gallon (3.75 liters) GRIP-FLEX ® SOLAR CLEAR ™ 266 coating<br>2 ounces (59.1 milliliters) T-2003 ™ reducer<br>4 ounces (118 milliliters) acetone |

Example IV. The art surface was prepared substantially according to the procedures presented in Example I with the components noted in Table III.

TABLE III

| Art Surface Preparation | |
|---|---|
| Substrate | Coating |
| 3 mm CELTEC ® PVC board | 2.5 pounds (1,133 grams) MICROGRIT WA ® No. 280 mesh grains<br>1 gallon (3.75 liters) GRIP-FLEX ® SOLAR CLEAR ™ 266 coating<br>2 ounces (59.1 milliliters) T-2003 ™ reducer<br>4 ounces (118 milliliters) acetone |

Example V. The art surface was prepared substantially according to the procedures presented in Example I with the components noted in Table IV.

TABLE IV

| Art Surface Preparation | |
|---|---|
| Substrate | Coating |
| 3 mm CELTEC ® PVC board | 3 pounds (1,360 grams) MICROGRIT A ® No. 320 mesh grains<br>1 gallon (3.75 liters) GRIP-FLEX ® SOLAR CLEAR ™ 266 coating<br>2 ounces (59.1 milliliters) T-2003 ™ reducer<br>6 ounces (177 milliliters) acetone |

Example VI. The art surface was prepared substantially according to the procedures presented in Example I with the components noted in Table V.

TABLE V

| Art Surface Preparation | |
|---|---|
| Substrate | Coating |
| 3 mm CELTEC ® PVC board | 2.5 pound (1,133 grams) MICROGRIT WA ® No. 240 mesh grains<br>1 gallon (3.75 liters) GRIP-FLEX ® SOLAR CLEAR ™ 266 coating with MIXIT ® color added<br>3 ounces (88 milliliters) T- |

TABLE V-continued

| Art Surface Preparation | |
|---|---|
| Substrate | Coating |
| | 2003 ™ reducer<br>6 ounces (177 milliliters)<br>acetone |

Example VII. The art surface was prepared substantially according to the procedures presented in Example I with the components noted in Table VI.

TABLE VI

| Art Surface Preparation | |
|---|---|
| Substrate | Coating |
| 3 mm CELTEC ® PVC board | 3.5 pounds (1,587 grams)<br>MICROGRIT WA ® No. 240 mesh grains<br>1 gallon (3.75 liters) GRIP-FLEX ® SOLAR CLEAR ™ 200 coating<br>3 ounces (88 milliliters) T-2003 ™ reducer<br>6 ounces (177 milliliters)<br>acetone |

Test Method I. An art surface was prepared in accordance with Example IV. Oil paints were applied to the art surface. The art surface accepted the medium while permitting the artist to modify and remove portions of the medium from the art surface during development of the work. The final work was observed for cracking, warping, and integrity over a period of six months. Table VII describes the test results.

TABLE VII

Results of Test Method I

| | Cracking | Warping | Loss of Integrity |
|---|---|---|---|
| 1 Week | No | No | No |
| 2 Weeks | No | No | No |
| 1 Month | No | No | No |
| 2 Months | No | No | No |
| 3 Months | No | No | No |
| 4 Months | No | No | No |
| 5 Months | No | No | No |
| 6 Months | No | No | No |

Test Method II. An art surface was prepared in accordance with Example IV. Oil and acrylic paints as well as chalk were applied to the art surface. The art surface accepted the mixed media while permitting the artist to modify and remove portions of the medium from the art surface during development of the work. The final work was observed for cracking, warping, and integrity over a period of six months. Table VIII describes the test results.

TABLE VIII

Results of Test Method II

| | Cracking | Warping | Loss of Integrity |
|---|---|---|---|
| 1 Week | No | No | No |
| 2 Weeks | No | No | No |
| 1 Month | No | No | No |
| 2 Months | No | No | No |
| 3 Months | No | No | No |
| 4 Months | No | No | No |
| 5 Months | No | No | No |
| 6 Months | No | No | No |

Moreover, the art surfaces of Examples I-III and V-VII exhibited test results equivalent to the art surface prepared according to Example IV. Further, the art surfaces of Examples I-VII exhibited similar test results for other medium including acrylic, chalk, charcoal, colored pencil, conte, dyes, egg tempera, pastel, water color, and combinations thereof. The results of the testing illustrate that the art surfaces having the aluminum oxide-based coating prepared in accordance with the teachings presented herein exhibit physical and chemical properties that are equivalent or better than those of existing artist's board with respect to a particular medium and superior to existing artist's boards with respect to their compatibility with a wide variety of media including mixed media.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An art surface for use by an artist developing a work, the art surface comprising:

a rigid, foamed polyvinyl chloride sheet defining a thermoplastic compatible surface and having a thickness of 3 mm to 25 mm;

a coating disposed in direct contact with the thermoplastic compatible surface defined by the rigid, foamed polyvinyl chloride sheet, the coating including a reaction product of a thermoplastic resin and aluminum oxide having approximately a 180 to approximately a 320 mesh; and an artistic canvas formed by the thermoplastic compatible surface and the coating, the artistic canvas adapted to be scored and accept a plurality of artistic mediums disposed in direct contact therewith, each of the plurality of artistic mediums selected being disposed in contact with the coating, wherein each of the plurality of artistic mediums are selected from the group consisting of artistic acrylic paint, chalk, charcoal, colored pencil, conte, dyes, egg tempera, oil, pastel, water color, and mixed media combinations thereof, wherein the coating permanently accepts the artistic medium following a period permitting the artist to modify, layer, and remove portions of the artistic medium from the coating during development of the work.

2. The art surface as recited in claim 1, wherein the coating is cured prior to an application of the artistic medium.

3. The art surface as recited in claim 1, wherein the aluminum oxide is reacted in a ratio of approximately 1.0 pound (453 grams) to 3.5 pounds (1,588 grams) per 1 gallon (3.75 liters) of the thermoplastic.

4. The art surface as recited in claim 1, wherein the thermoplastic resin comprises an acrylic coating.

5. The art surface as recited in claim 1, wherein the thermoplastic resin comprises a transparent acrylic coating.

6. The art surface as recited in claim 1, wherein the reaction product of the coating further comprises acetone.

7. The art surface as recited in claim 1, wherein the reaction product of the coating further comprises a nonprimary component selected from the group consisting of fillers, antiaging agents, and coloring agents.

8. An art surface for use by an artist developing a work, the art surface comprising:

a rigid, foamed acrylonitrile butadiene styrene sheet defining a thermoplastic compatible surface and having a thickness of 3 mm to 25 mm;

a coating disposed in direct contact with the thermoplastic compatible surface defined by the rigid, foamed acrylonitrile butadiene styrene sheet, the coating including a reaction product of a thermoplastic resin and aluminum oxide having approximately a 180 to approximately a 320 mesh; and an artistic canvas formed by the thermoplastic compatible surface and the coating, the artistic canvas adapted to be scored and accept a plurality of artistic mediums disposed in direct contact therewith, each of the plurality of artistic mediums selected being disposed in contact with the coating, wherein each of the plurality of artistic mediums are selected from the group consisting of artistic acrylic paint, chalk, charcoal, colored pencil, conte, dyes, egg tempera, oil, pastel, water color, and mixed media combinations thereof, wherein the coating permanently accepts the artistic medium following a period permitting the artist to modify, layer, and remove portions of the artistic medium from the coating during development of the work.

* * * * *